United States Patent [19]

Mroz et al.

[11] Patent Number: 4,648,002
[45] Date of Patent: Mar. 3, 1987

[54] WIPING SYSTEM FOR MAGNETIC RECORDING DISKS

[75] Inventors: Edward Mroz, Menlo Park; Victor B. van Blerk, San Jose, both of Calif.

[73] Assignee: Verbatim Corporation, Sunnyvale, Calif.

[21] Appl. No.: 660,141

[22] Filed: Oct. 12, 1984

[51] Int. Cl.⁴ ............................................. G11B 5/012
[52] U.S. Cl. ..................................... 360/137; 360/97; 15/256.5
[58] Field of Search ............ 360/137; 15/210 R, 256.5, 15/97 R

[56] References Cited

U.S. PATENT DOCUMENTS

| | | | |
|---|---|---|---|
| 4,101,948 | 7/1978 | Tadokoro et al. | 360/137 |
| 4,251,843 | 2/1981 | Masuyama et al. | 360/137 |
| 4,470,083 | 9/1984 | Doering et al. | 360/97 |

FOREIGN PATENT DOCUMENTS 86171  5/1982  Japan .

Primary Examiner—A. Michael Chambers
Attorney, Agent, or Firm—Steve W. Gremban

[57] ABSTRACT

A protective jacket for permanently containing a floppy-type magnetic recording disk includes a liner attached to at least one of the interior sidewalls of the jacket in a manner whereby a protruding warp is formed in the liner having the form of an elongated ridge. The warp protrudes far enough from the interior wall of the jacket so that, upon rotation of the disk, the warp is deformed and resiliently wipes the face of the disk to remove dust and the like, thereby preventing errors in reading/writing upon the disk.

16 Claims, 8 Drawing Figures

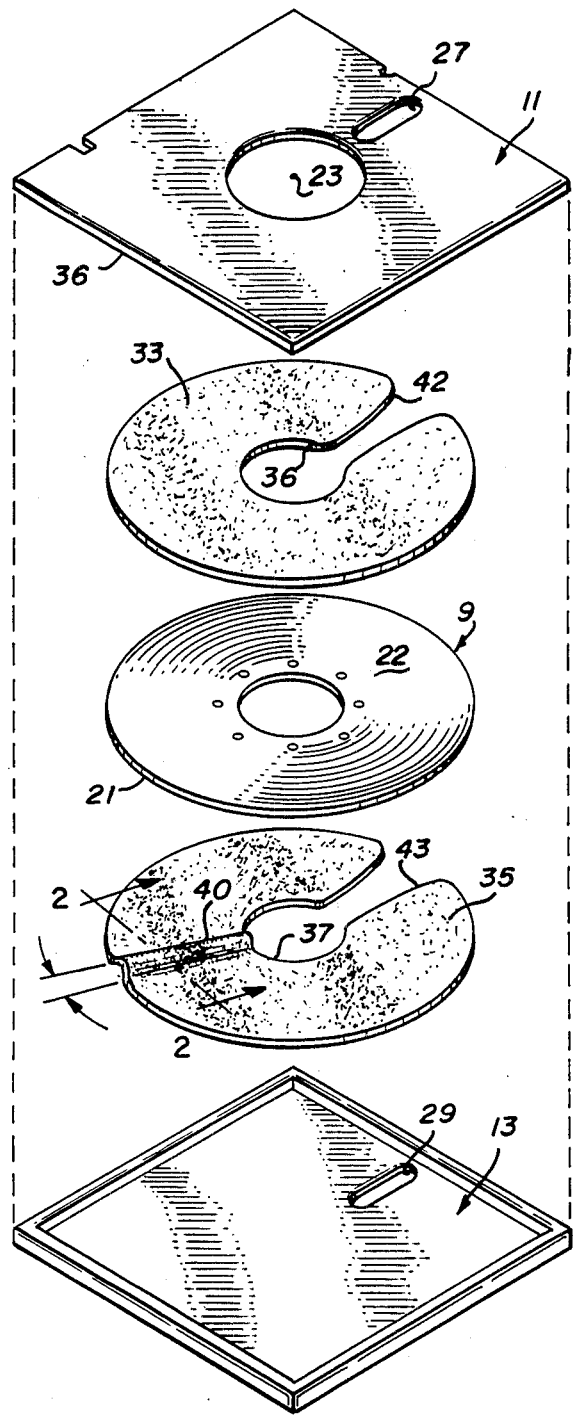
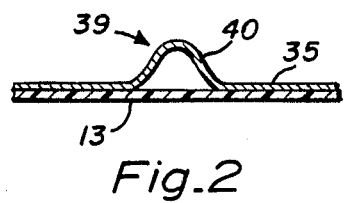
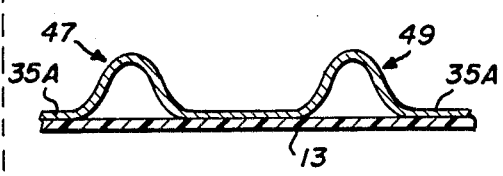
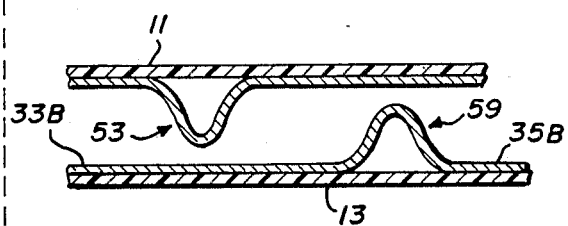

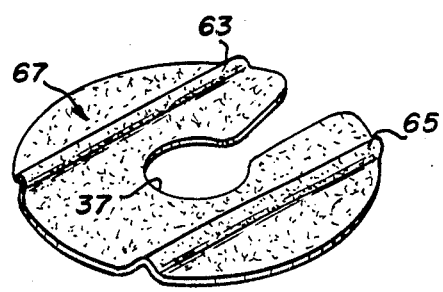
Fig_5
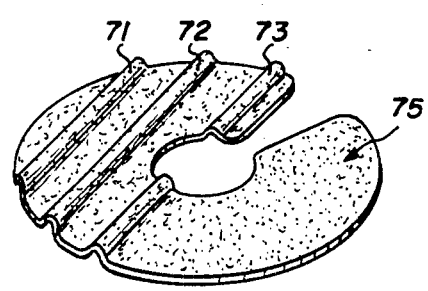
Fig_6
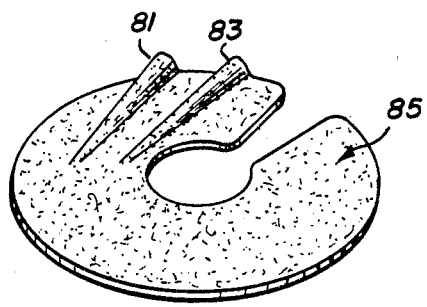
Fig_7
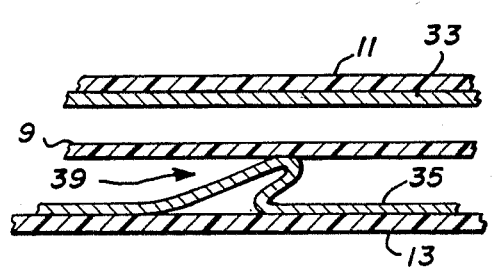
Fig_8

WIPING SYSTEM FOR MAGNETIC RECORDING DISKS

BACKGROUND OF THE INVENTION

1. Field of the Invention

The present invention relates to an improved system for data processing incorporating a rotatable magnetic recording disk and, more particularly, to a system including such a disk, a jacket for protecting the disk, and a liner mounted on an interior wall of the jacket to wipe across the disk when it is rotatably driven.

2. Description of the Prior Art

It is well known to store information for data processing systems on rotatably-driven magnetic disks. Information on such magnetic disks may be written (i.e., stored) or read (i.e., retrieved) by selectively positioning a magnetic transducer, called a read/write head, at the surface of the rotating disk. It is also well known that such disks can be made flexible or "floppy", and in such instances that it is necessary to provide a permanent shell or protective jacket, analagous to an envelope cover for a phonograph record, so that the disk remains planar during rotation. It is also known that jackets for such floppy disks may be rigid shells or may have some flexure. As used herein, the term jacket should be understood to include both flexible and rigid shells. Such jackets must, of course, have openings formed therein so that the disk can be connected to a drive device and so that the read/write transducer can be postioned immediately adjacent to the face of the disk.

Because of the necessary openings in the jackets for flexible magnetic recording disks, a frequently encountered problem with usage of such disks is that foreign matter, such as dust particles, may contact the surface of the disk and cause errors in recording or retrieving information on the disk. To minimize errors arising from such causes, it is known to provide soft liners on the interior of a disk jacket and to provide means which cause flexure of the jacket, or the liner, to gently press the liners against the face of the disk to wipe foreign material from the disk during rotation and, thereby, prevent dust particles and the like from reaching the read/write transducer.

In the prior art, U.S. Pat. No. 3,864,755 discloses a protective cartridge for a disk, with the flat interior walls of the cartridge coated with a low-friction porous material to wipe against the opposed faces of the disk.

Similarly, U.S. Pat. No. 4,254,864 discloses a protective jacket for holding a rotatable magnetic disk between two flat buffer sheets bonded to the inner surfaces of the jacket. The patent suggests that the buffer sheets may be either formed as a flat annulus or as a flat spiral with respect to the axis of rotation of the magnetic disk.

As still another example of prior art, U.S. Pat. No. 4,413,298 discloses a flat sheet of fabric mounted to the interior of a diskette jacket to wipe against the surface of a rotatable disk. According to this patent, the wiping fabric may be formed from tissue or from a flocked-fiber layer. Likewise, U.S. Pat. No. 4,251,843 discloses a flat layer of fabric fixed to the interior of a protective jacket to clean the surface of a rotatable magnetic disk. And again, a flat wiping sheet is shown mounted within a protective cover for a disk in U.S. Pat. No. 3,668,658.

In practice, where a deformable protective jacket or envelope is used in combination with a flat wiping sheet as described herein above, it is typical to provide a rigid supporting member, usually called a platen, integral to the disk drive and then to provide a pressure pad to press against the outside of the jacket so as to deform it in a manner which presses the wiping sheet or a wiping pad into contact with the disk. As to jackets which are rigid (i.e., not deformable), it is known to mount a spring member, such as one made of a plastic film, polyester or the like, within the rigid jacket and to position a section of wiping material so that the distal portion of the spring member forces the wiping material against the face of the disk.

SUMMARY OF THE PRESENT INVENTION

It is an object of the present invention to provide a permanent protective jacket for a magnetic recording disk including improved means for gently wiping the surface of the magnetic recording disk during rotation thereof. More specifically, an object and advantage of the present invention is to provide a readily and simply fabricated means for softly wiping the surface of a flexible magnetic recording disk mounted for rotation within a permanent jacket.

In accordance with the present invention, in a preferred embodiment there is provided an improved magnetic recording system including a protective jacket for permanently containing a magnetic recording disk for free rotation therein, a liner attached to at least one of the interior sidewalls of the jacket in a manner such that a warp is formed in the liner to protrude from the interior wall of the jacket to form an elongated ridge which extends across the disk at a sufficient distance from the jacket wall such that, upon rotation of the disk, contact between the face of the disk and the ridge wipes the face of the disk to remove foreign material, such as dust particles and the like, and thereby prevents such materials from interfering with a read/write transducer operating upon the disk. The inherent resiliency, or springiness, of the material forming the liner is sufficient to bias the warp in the liner against the disk without auxillary internal or external biasing means.

As described herein, the present invention may have various embodiments. For example, a liner may be secured to both of the interior sidewalls of the protective jacket, and a protruding warp may be formed in each of the liners so that both faces of a disk are wiped during rotation of the disk. As another example, in a somewhat different embodiment of the present invention, a single liner may have two or more warps formed therein, both of which form elongated ridges to contact the same face of the disk.

Thus, a primary advantage of the present invention is the provision of a disk wiping means which is readily fabricated and which eliminates the need for separate internal or external biasing means to force the wiping means into contact with the recording surface of a magnetic recording disk.

These and other objects and advantages of the present invention will no doubt become obvious to those of ordinary skill in the art after having read the following detailed description of the preferred embodiments which are illustrated in the various drawing figures.

IN THE DRAWING

FIG. 1 is a pictorial view, exploded for ease of comprehension, of a magnetic recording system according to the present invention;

FIG. 2 is a cross-sectional detail of a portion of the recording system of FIG. 1 in unassembled condition; this cross-sectional view may be understood to be taken along the line 2—2 in FIG. 1 for viewing in the direction of the arrows;

FIG. 3 is a cross-sectional detail, analogous to the cross-sectional view in FIG. 2, of an alternative embodiment of the present invention;

FIG. 4 is a cross-sectional detail, also analogous to the detail shown in FIG. 2, of yet another embodiment of the present invention;

FIG. 5 is a planar detail view of still other alternative embodiments of the present invention;

FIG. 6 is a planar detail view of still other alternative embodiments of the present invention;

FIG. 7 is a planar detail view of still other alternative embodiments of the present invention; and FIG. 8 is a cross-sectional detail taken, for instance, along the line 2—2 in FIG. 1 for viewing in the direction of the arrows, and showing the recording system in an assembled condition.

DETAILED DESCRIPTION OF THE PREFERRED EMBODIMENT

Referring initially to the magnetic recording system in FIGS. 1 and 2, a flexible magnetic recording disk, generally indicated by the numeral 9, is mounted within a permanent jacket comprised of mating shell members 11 and 13 having raised peripheral rims 14 and 15, respectively. In assembled condition, the shell members 11 and 13 are connected together about their outer peripheries to provide a permanent protective envelope, or jacket, for the magnetic recording disk 9. The raised peripheral rims 14 and 15 provide space within the jacket for the disk 9 to rotate. In practice, it is preferred that the shell members 11 and 13 be relatively rigid; the shell members may be formed, for example, from a polyvinylchloride material.

To permit the magnetic recording disk to be rotatably driven within the protective jacket between the shell members 11 and 13, a central aperture 23 is formed through the shell member 11. A conventional drive means (not shown) can then be connected through the aperture 23 to rotatably drive the magnetic recording disk 9. In typical practice, various notches, grooves and other apertures are formed in the shell members 11 and 13 to provide means for holding or gaining access to the disk; because such features are primarily matters of design choice, they are not illustrated and will not be further described herein.

As is typical, the recording disk 9 has opposed planar faces 21 and 22 upon which is provided a magnetizable coating to store data. To provide access through the protective jacket for a read/write transducer (not shown) to be located immediately adjacent the face 21 or 22 of the disk 9, elongated slot-like apertures 27 and 29 are formed through the shell members 11 and 13, respectively, and located to extend radially across the effective recording area, or tracks, on the respective flat faces of the disk 9. As is also typical, the apertures 27 and 29 are in registry with one another as shown in FIG. 1.

As best shown in FIG. 1, generally circular lining sheets, or "liners", 33 and 35 are fixed to the respective interior sidewalls 36 and 37 of the protective shells members 11 and 13. The liners sheets 33 and 35 have, when viewed in plan, central apertures 36 and 37, respectively, formed therein in registry with the central aperture 23 in the shell member 11. Further, in the liner 33, an open-ended radial slot 42 is formed to extend from the central aperture 36; likewise, an open-ended slot 43 is formed to extend radially from the central aperture 37 in the liner 35. In the assembled device, as will be explained later herein in detail, the apertures 27 and 29 are in registry with the slots 42 and 43.

In accordance with the present invention, at least one of the liners 33 or 35 is configured and fixed to the associated jacket interior sidewall to have at least one warp therein which extends, or protrudes away from the interior wall of the jacket in a direction to contact the adjacent planar face of the magnetic disk 9. Thus, in the particular embodiment shown in FIG. 1, a warp generally indicated by the numeral 39 is formed in the liner 35 to provide a ridge-like surface 40 which extends across the face 21 of the magnetic recording disk 9 to contact the disk from at least the inner periphery to the outer periphery of the effective recording area on the face of the disk. Thus, when viewed in cross-section as in FIG. 2, the warp 39 has a bump-like shape and presents a convex surface to the adjacent face of the magnetic disk 9 to wipe across the face of the disk when the same is rotated within the protective jacket.

FIG. 2 is a cross-sectional view of the jacket 13 and the liner 35 connected together, without the other components in FIG. 1. As will be explained later in conjunction with FIG. 8, the configuration of the warp 39 will change when the components are assembled.

In the embodiment illustrated in FIGS. 1 and 2, the warp 39 is oriented generally radially across the face of the disk 9; however, as will be evident from consideration of the other embodiments illustrated herein, other orientations may be utilized. Although it is desirable that the warp 39 have a generally constant height in the unassembled condition, it is acceptable if the height varies somewhat.

It should also be appreciated that the warp 39 in the liner 35 illustrated in FIGS. 1 and 2 are especially convenient and simple to fabricate. Thus, in a manufacturing process, the liner 35 can be initially formed as complete circular piece and then cut radially to form the radial slot 43. Then the warp 39 is readily formed when the edges of the radial slot 43 are spread slightly apart. To permanently position the warp 39, the liner 35 is connected to the adjoining face of the shell 13, as by ultrasonic welding or cementing. The angular position of the warp 39 on the liner is largely a matter of design choice; so, for example, the warp may be positioned close to the radial slot 43 or nearly opposite the slot as shown.

In practice, it is preferred that the warp 39 be initially formed to protrude from the sidewall to which it is attached toward the opposite interior sidewall of the jacket a distance more than one-half the distance between the interior sidewalls. Typically, it is effective to have the warp height be about 0.10 to about 0.15 inches. A typical effective width of the base of the warp, measured arcuately as indicated by the curved arrows in FIG. 1, is about fifteen degrees; with a disk having a diameter of two to eight inches, the width of the base of the warp at the periphery of the liner is about 0.4 to about 0.5 inches.

Referring now to the embodiment of FIG. 3, a liner 35A, which is essentially similar to the previously described liner 35, is mounted to the jacket 13 so as to form two warps 47 and 49 which are spaced apart by some predetermined angular distance and both formed to extend generally radially across the adjacent face of the magnetic recording disk (not shown). In this embodiment, the warps 47 and 49 are essentially identical to one another, and to the aforementioned warp 39. In practice, a typical angular distance between two warps 47 and 49 might be about fifteen degrees. Again, as in the embodiment of FIGS. 1 and 2, each of the warps 47 and 49 preferrably extends more than about one-half the distance towards the opposing shell member 11 of the jacket, and each warp presents an elongated, ridge-like convex surface to the adjacent face of the magnetic recording disk. Thus, in operation, the ridge-like surfaces of both of the ridges 47 and 49 wipe across the face of the magnetic recording disk when the same is rotated.

Referring now to FIG. 4, there is shown an embodiment of the present invention wherein warps 53 and 59 are formed in the liners 33B and 35B on both of the opposed interior sidewalls of the jacket members 11 and 13, respectively. The warp 53 is essentially identical to the warps previously described herein but is formed in the liner 33B which, in the prior embodiments, was understood to be flat. Here again, in the unassembled condition, it is preferred that the warps protrude toward the opposite interior sidewalls of the jacket a distance more than one-half the distance separating the interior sidewalls. (As to FIG. 4, it should be appreciated that there is no showing of a magnetic recording disk within the jacket; accordingly, the system should be understood to be in unassembled condition. As will be appreciated upon consideration of FIG. 8, insertion of a magnetic recording disk will cause substantial deformation of the warps 53 and 59.) Normally, the warps 53 and 59 in this embodiment will not be formed exactly opposite one another, but will be offset, say by an angular distance of about fifteen degrees or more, to permit each warp initially to be of a height which extends more than half the distance between the interior sidewalls of the jacket.

In practice, the preferred material for the liners is rayon; however, other materials such as polypropelene and polyester may be utilized. In any event it is important that the liner material be soft, so as not to injure the face of the disk, and resilient so that the inherent flex or springiness of the material forming the liners is sufficient to bias the warp in the liner against the adjacent face of the magnetic recording disk.

In the embodiment shown in FIG. 5, two warps 63 and 65 are formed in a liner 67, with the warps extending across the circular liner as chords (i.e. in a non-radial direction). As previously described, these warps can be provided by appropriately deforming the liner and then fixing the liner in permanent position to the interior sidewall of the associated jacket. In this particular embodiment, the warps 63 and 65 are on opposite sides of the central aperture 38B in the liner.

In the embodiment in FIG. 6, a plurality of warps 71, 72, and 73 are formed in a liner 75 on one side of the central aperture 38B in the liner. As in the embodiment of FIG. 5, the warps extend as chords across the circular liner. Again, these warps can be provided by appropriately deforming the liner and then permanently fixing it to the interior sidewall of the associated jacket.

In the embodiment in FIG. 7, warps 81 and 83 are formed in a liner 85 on one side of the central aperture 37. Similar to the embodiments in FIGS. 5 and 6, the warps extend non-radially of the circular liner; however, unlike the prior embodiments, the warps 81 and 83 extend only partly across the circular liner 85. The length of the warps should be sufficient that, upon rotation of the magnetic recording disk, the entire effective recording surface of the disk is wiped by the warps.

In all of the aforedescribed alternative embodiments, it is preferred that the ridge height of the warps be generally constant over that portion of the warps extending across the effective recording area of the magnetic recording disk.

Referring now to FIG. 8, there is shown a cross-sectional view of the embodiments of FIGS. 1 and 2 in assembled condition, i.e. in a system including the magnetic recording disk 9. In FIG. 8, the direction of rotation of the disk is indicated by the arrow. It may now be really appreciated that the presence of the magnetic recording disk causes deformation of the warp 39 in the liner 35 and, during rotation of the disk, the warp will nearly fold back upon itself to take on a non-symmetrical appearance. The warps shown in FIGS. 3-7 will be similarly deformed by the recording disk in an assembled condition. Further, it may be appreciated that the inherent resiliency of the material forming the liner causes the warp in the liner to press against the adjacent face of the magnetic recording disk without the need for other biasing means, whether internal or external to the jacket housing the disk.

Thus, although the magnetic recording disk is of the floppy type, the disk should be understood to be relatively inflexible in comparison to the liner material forming the warps. This is especially true under dynamic conditions as prevail when the disk is rotated.

Although the present invention has been described with particular reference to the illustrated preferred embodiments, it is to be understood that such disclosure is not to be interpreted as limiting. Various other alterations, modifications and embodiments will no doubt become apparent to those skilled in the art after having read the preceding disclosure. Accordingly, it is intended that the appended claims be interpreted as covering all such alterations, modifications and embodiments as fall within the true spirit and scope of the present invention.

We claim:
1. A magnetic recording system, comprising:
a flexible magnetic recording disk having generally planar faces;
a permanent protective jacket for housing the disk for free rotation about a central axis normal to said generally planar faces, the jacket having opposed parallel interior sidewalls between which the disk rotates substantially equidistantly from the interior sidewalls;
first deformable liner means fixed to at least one of the interior sidewalls of the jacket, the liner means having a first wrap formed therein to protrude from the interior sidewall of the jacket to which the liner is attached toward the opposite interior side wall of the jacket a distance more than one-half the distance between the interior sidewalls, the first warp forming an elongated ridge which extends across at least a portion of the adjacent planar face of the disk and is substantially non-symmetrically deformed by the disk to resiliently wipe against the effective recording area of the disk when the same is driven to rotate within the jacket.
2. A magnetic recording system according to claim 1 wherein:

the first wrap extends in a direction generally radial of the magnetic recording disk.

3. A magnetic recording system according to claim 1 wherein:
the first warp extends in a non-radial direction relative to the magnetic recording disk.

4. A magnetic recording system according to claim 1 wherein:
the first liner means has a second warp formed therein to extend from the same interior sidewall of the jacket as said first warp, and said second warp also forms an elongated ridge which extends across the disk to resiliently wipe against said adjacent planar face of the magnetic recording disk.

5. A magnetic recording system according to claim 4 wherein:
the first and second warps both extend in directions generally radial of the magnetic recording disk.

6. A magnetic recording system according to claim 4 wherein:
the first and second warps extend in non-radial directions relative to the magnetic recording disk.

7. A magnetic recording system according to claim 6 wherein:
the first and second warps are parallel to one another and extend as chords relative to the magnetic recording disk.

8. A magnetic recording system according to claim 7 wherein:
the first and second warps extend only partly across the first liner means.

9. A magnetic recording system according to claim 1 further including:
a second deformable liner means attached to the interior sidewall of the jacket opposite the first liner means, the second liner means having a warp formed therein forming an elongated ridge which extends across the adjacent planar face of the magnetic recording disk to resiliently wipe against the recording area of the disk when the same is driven to rotate within the jacket.

10. A magnetic recording system according to claim 9 wherein
both the warps in said first and second liner means protrude, in undeformed condition, toward the opposite interior sidewall of the jacket a distance more than one-half the distance separating said interior sidewalls.

11. A magnetic recording system according to claim 1 wherein
said first warp protrudes from said sidewall a distance of about 0.10 to about 0.15 inches.

12. A magnetic recording system according to claim 1 wherein
said first warp has a width at its base of about fifteen degrees measured angularly.

13. A magnetic recording system according to claim 1 wherein
the first lining sheet means is generally circular.

14. A magnetic recording system according to claim 1 wherein
the liner means is formed of a material having an inherent resiliency such that the first warp is resiliently biased against the adjacent face of the magnetic recording disk without auxillary biasing means.

15. A method for fabricating a magnetic recording system including a floppy-type magnetic recording disk having generally planar faces, a jacket for permanently containing the disk for free rotation therein about a central axis normal to said generally planar faces, the jacket having opposed interior sidewalls, comprising:
forming a flat liner sheet to have a disk-like configuration with a generally circular periphery and a central circular aperture;
servering the liner in a radial direction to form two opposed generally radial edges;
separating the radial edges to form a gap therebetween while concurrently bending the flat liner for form at least one warp in the liner, which warp has the shape of an elongated protruding ridge;
affixing the lining sheet, with the warp formed therein, to one of the interior sidewalls of the jacket; and
inserting the magnetic recording disk within the jacket for rotation such that the warp in the liner is deformed and resiliently presses against the adjacent face of the disk to wipe the same during rotation without the aid of auxillary means to bias the liner against the disk.

16. A method for fabricating a magnetic recording system including a floppy-type magnetic recording disk having generally planar faces, a jacket for permanently containing the disk for free rotation therein about a central axis normal to said generally planar faces, the jacket having opposed interior sidewalls, comprising:
forming a flat liner sheet having an outer periphery and a central circular aperture;
severing the liner from its central aperture to its outer periphery to form two opposed generally radial edges;
separating the radial edges to form a gap therebetween while concurrently bending the flat liner to form at least one warp in the liner, which warp has the shape of an elongated protruding ridge and extends a sufficient distance from one of the interior sidewalls of the jacket to engage the face of the disk upon rotation thereof;
affixing the lining sheet, with the warp formed therein, to the one interior sidewall of the jacket; and
inserting the magnetic recording disk within the jacket for rotation such that the warp in the liner is deformed and resiliently presses against the adjacent face of the disk to wipe the same during rotation without the aid of auxillary means to bias the liner against the disk.

* * * * *